(12) United States Patent
Wang et al.

(10) Patent No.: US 7,379,171 B2
(45) Date of Patent: May 27, 2008

(54) OPTICAL OBJECT DISTANCE SIMULATION DEVICE

(75) Inventors: Bily Wang, Hsin Chu (TW);
Chih-Ming Wang, Hsinchu (TW);
Kuei-Pao Chen, Hsinchu (TW);
Kuo-Lung Kuo, Hsinchu (TW)

(73) Assignee: Youngtek Electronics Corporation, Hsinchu (TW)

( * ) Notice: Subject to any disclaimer, the term of this patent is extended or adjusted under 35 U.S.C. 154(b) by 163 days.

(21) Appl. No.: 11/476,166

(22) Filed: Jun. 28, 2006

(65) Prior Publication Data

US 2008/0002188 A1 Jan. 3, 2008

(51) Int. Cl.
*G01B 9/00* (2006.01)

(52) U.S. Cl. ...................... 356/124; 356/125
(58) Field of Classification Search ...... None
See application file for complete search history.

(56) References Cited

U.S. PATENT DOCUMENTS 5,331,394 A * 7/1994 Shalon et al. ............... 356/124

2005/0264795 A1* 12/2005 Murata ....................... 356/127

FOREIGN PATENT DOCUMENTS

JP 56044821 A * 4/1981

* cited by examiner

Primary Examiner—Michael P. Stafira
(74) Attorney, Agent, or Firm—Rosenberg, Klein & Lee

(57) ABSTRACT

An optical object distance simulation device is disclosed. The device has an optical lens module composed of a plurality of optical lens and the optical lens module is arranged between an optical lens and a chart for simulating the real object distance and reducing the space required for testing an optical lens. Moreover, the optical lens module is separated from a light-emitting element, a power supply or any heat-generating elements all separated from the optical lens module. Furthermore, the heat-dissipating elements are arranged near elements that generate substantial heat. Hence, not only does the present invention have a good heat-dissipating effect, but it also prevents external dust from polluting the optical lens module because of the positioning of the heat-dissipating element and the heat-dissipating hole.

9 Claims, 2 Drawing Sheets

OPTICAL OBJECT DISTANCE SIMULATION DEVICE

BACKGROUND OF THE INVENTION

1. Field of the Invention

The present invention relates to an optical object distance simulation device, and particularly relates to a device for reducing a real object distance between an optical lens and a chart.

2. Description of the Related Art

Referring to FIG. 1, a known optical lens-testing device is disclosed. The device has a light-emitting element 1a, a chart 2a, and a lens 3a. The light-emitting element 1a projects light beams onto the chart 2a, and a real object distance d between the lens 3a and the chart 2a can be adjusted according to different testing needs, for testing the quality of the optical lens 3a. An effective FOV (Field of View) of the optical lens 3a corresponding to the chart 2a is shown as the dotted line in FIG. 1.

However, the real object distance d between the optical lens 3a and the chart 2a is too long, so that the testing space required is too large. Hence, the known optical lens-testing device is not economical, and is inconvenient.

SUMMARY OF THE INVENTION

The present invention provides an optical object distance simulation device. The device reduces a real object distance between a lens and a chart by a method of simulating a real object distance. In other words, an optical lens module composed of a plurality of optical lenses is disposed between the optical lens and the chart (a test chart, a test object, or a test target) for simulating the real object distance, so as to reduce the required testing space.

Moreover, the present invention has light-emitting elements, and a power supply or any heat-generating elements all separated from the optical lens module. It further includes sets of heat-dissipating elements (such as a fan) disposed near elements that generate substantial heat. Hence, the present invention not only has a good heat-dissipating effect, but also prevents external dust from passing through the heat-dissipating elements or heat-dissipating holes into the optical lens module to pollute the optical lenses. In addition, the present invention's charts can be rotated via driving a motor, so as to change different charts and simulated object distances easily, for reducing the amount of time each testing requires.

A first aspect of the present invention is an optical object distance simulation device, comprising: a control unit, an object distance simulation unit, and a light-guiding unit. The control unit includes a first casing, a light-emitting element, and a heat-dissipating element. The light-emitting element is disposed in the first casing, and the heat-dissipating element is disposed in the first casing or on the first casing for dissipating heat from the light-emitting element.

Moreover, the object distance simulation unit includes a second casing, a base seat, a motor, a turret, and an optical lens module. The base seat is disposed in the second casing, and the motor is disposed in the second casing and slidably disposed on the base seat. The turret is disposed in the second casing and pivoted on an axle of the motor, wherein the turret has a plurality of charts, and the optical lens module is disposed on the second casing for selectively corresponding to any one of the charts.

Furthermore, the light-guiding unit has one side disposed beside one side of the light-emitting element, and the other side is disposed beside one of the charts, for guiding and projecting light beams from the light-emitting element to one of the charts. Whereby, using the optical lens module simulates a real object distance for reducing an object distance between a lens and any one of the charts.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF THE DRAWINGS

The various objects and advantages of the present invention will be more readily understood from the following detailed description when read in conjunction with the appended drawings, in which.

DETAILED DESCRIPTION OF PREFERRED BEST MOLDS

Figure 1:
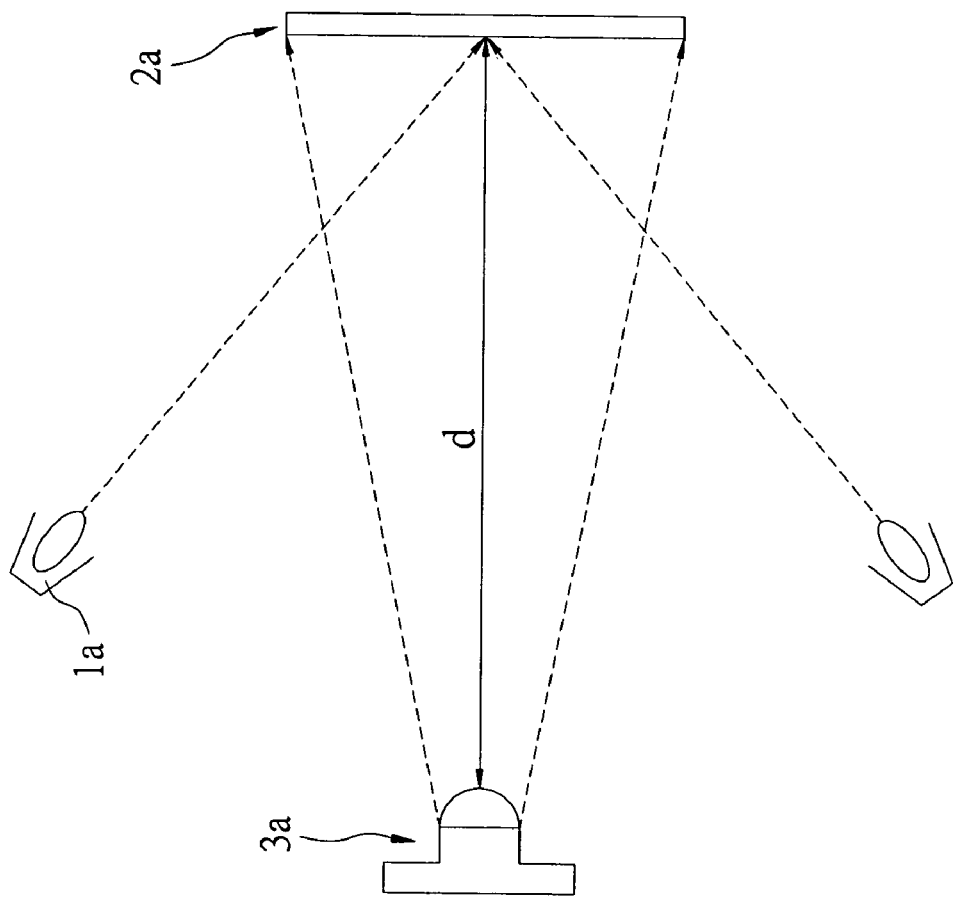
FIG. 1 is a schematic diagram of an optical lens-testing device of a prior art.
Figure 2:
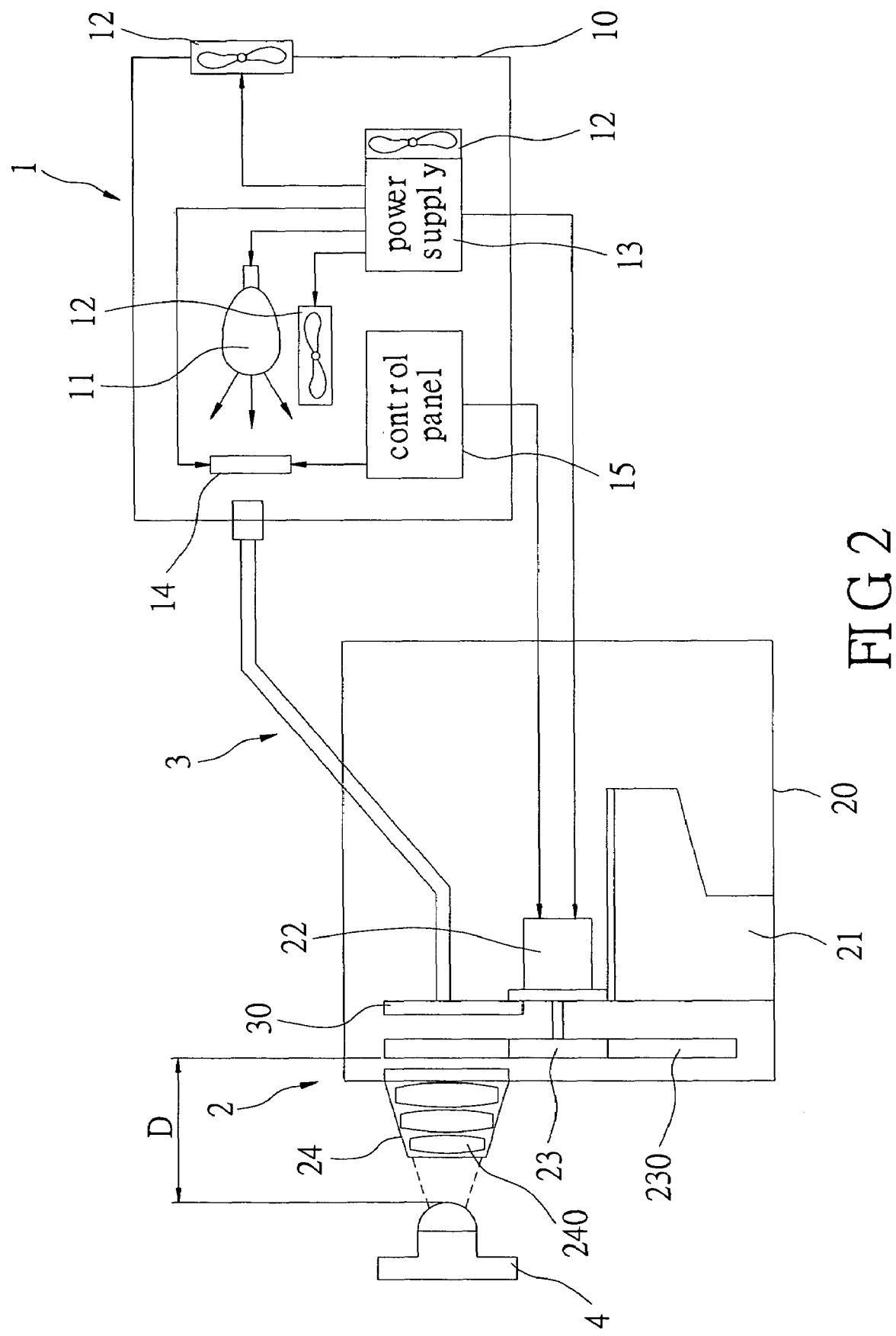
FIG. 2 is schematic diagram of an optical object distance simulation device of a present invention.

Referring to FIG. 2, the present invention provides an optical object distance simulation device, comprising: a control unit 1, an object distance simulation unit 2, and a light-guiding unit 3.

The control unit 1 includes a first casing 10, and a light-emitting element 11, a heat-dissipating element 12, a power supply 13, a color filter 14, and a control panel 15 all disposed in the first casing 10. The light-emitting element 11 can be an LED, and the heat-dissipating element 12 can be embedded on the first casing 10 for dissipating heat from the light-emitting element 11 that is near the heat-dissipating element.

Moreover, the power supply 13 is used to supply power to the light-emitting element 11 and the heat-dissipating element 12. The color filter 14 is disposed between the light-emitting element 11 and the light-guiding unit 2. In addition, the control panel is used to control rotation of the color filter 14 for generating white light or color light that is needed for testing.

Furthermore, the object distance simulation unit 2 includes a second casing 20, and a base seat 21, a motor 22, a turret 23, and an optical lens module 24 all disposed in the second casing 20. The power source of the motor 22 is the power supply 13. The control panel 15 controls the rotation and the position of the motor 22, and the motor 22 is slidably disposed on the base seat 21. The control panel 15 also controls the movement of the motor 22 on the base seat 21. For example, the base seat 21 has a track (not shown) and a sliding element (not shown) sliding on the track. Hence, if the motor 22 is fixed onto the sliding element, the motor 22 can be slid along the track by sliding the sliding element along the track.

In addition, the turret 23 is pivoted on an axle of the motor 22 so that the turret 23 can be rotated by the rotation of the motor 22. The turret 23 has a plurality of charts 230, and the turret 23 can be replaced according to a user's need. Furthermore, the optical lens module 24 is an object distance simulation optical lens for simulating the real object distance, and the optical lens module 24 has a plurality of optical lenses 240 arranged in different spacing. Moreover, the motor 22 drives the turret to rotate, and the optical lens module 24 is exposed out of the second casing 20 for selectively corresponding to any one of the charts 230.

Furthermore, the light-guiding unit 3 can be an optical fiber. The light-guiding unit 3 has one side disposed beside one side of the light-emitting element 11, and the light-guiding unit 3 has the other side (the other side is a face projector 30) disposed beside one of the charts 230, for guiding and projecting light beams from the light-emitting element 11 to one of the charts 230.

Hence, when the light beams are projected on to one of the charts 230 via the face projector 30, images of one of the charts 230 pass through the optical lens module 24 and are projected onto a lens 4 without requiring a longer real object distance such as is needed in the prior art. Only a simulated object distance D that is shorter than the real object distance is required. The optical lens module 4 is used to simulate the real object distance for reducing the object distance D between the lens 4 and any one of the charts 230. In addition, when the lens 4 is moved into an effective FOV (Field of View) shown as a dotted line (see FIG. 2), the lens 4 receives whole image signals from the optical lens module 24.

In conclusion, the device reduces a real object distance between the lens 4 and one of the charts 230 by simulating the real object distance. In other words, the optical lens module 24 composed of a plurality of optical lenses 240 is disposed between the lens 4 and one of the charts 230 for simulating the real object distance, so as to reduce the testing space.

Moreover, the light-emitting element 11, the power supply 13, or any heat-generating element, are all separated from the optical lens module 24, and the heat-dissipating element 12 is disposed near elements that generates substantial heat. Hence, the present invention not only has a good heat-dissipating effect, but also prevents external dust from passing through the heat-dissipating element 12 or heat-dissipating holes (not shown) into the optical lens module to pollute the optical lenses 240. In addition, the charts 230 of the present invention can be rotated via driving the motor, so as to change different charts 230 and simulated object distance easily, thereby reducing the amount of time required for the testing process.

Although the present invention has been described with reference to the preferred best molds thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An optical object distance simulation device, comprising:
   a control unit comprising:
      a first casing;
      a light-emitting element disposed in the first casing; and
      a heat-dissipating element disposed in the first casing or on the first casing for dissipating heat from the light-emitting element;
   an object distance simulation unit comprising:
      a second casing;
      a base seat disposed in the second casing;
      a motor disposed in the second casing and slidably disposed on the base seat;
      a turret disposed in the second casing and pivoted on an axle of the motor, wherein the turret has a plurality of charts; and
      an optical lens module disposed on the second casing for selectively corresponding to any one of the charts; and
   a light-guiding unit having one side disposed beside one side of the light-emitting element, and another side disposed beside one of the charts, for guiding and projecting light beams from the light-emitting element to one of the charts;
   whereby, the optical lens module is used to simulate a real object distance for reducing an object distance between a lens and any one of the charts.

2. The device as claimed in claim 1, wherein the light-emitting element is an LED.

3. The device as claimed in claim 1, wherein the control unit further comprises a power supply for supplying power to the light-emitting element, the heat-dissipating element, and the motor.

4. The device as claimed in claim 1, wherein the control unit further comprises a color filter disposed between the light-emitting element and the light-guiding unit.

5. The device as claimed in claim 4, wherein the control unit further comprises a control panel for controlling rotation and positioning of the motor, movement of the motor on the base seat, and rotation of the color filter.

6. The device as claimed in claim 1, wherein the optical lens module is an object distance simulation optical lens for simulating the real object distance.

7. The device as claimed in claim 1, wherein the optical lens module has a plurality of optical lenses arranged in different spacing.

8. The device as claimed in claim 1, wherein the light-guiding unit is an optical fiber.

9. The device as claimed in claim 1, wherein the other side of the light-guiding unit is a face projector.

* * * * *